United States Patent
Beyer et al.

(10) Patent No.: US 10,797,572 B2
(45) Date of Patent: Oct. 6, 2020

(54) METHOD FOR PRODUCING A WINDING OF A WINDING CARRIER OF AN ELECTRIC MACHINE

(71) Applicant: CONTINENTAL AUTOMOTIVE GMBH, Hannover (DE)

(72) Inventors: Detlef Beyer, Berlin (DE); Rolf Jungnickel, Berlin (DE); Michalis Mames, Berlin (DE); Ricus Müller, Berlin (DE); Christoph Radtke, Berlin (DE)

(73) Assignee: Vitesco Technologies GmbH, Hannover (DE)

(*) Notice: Subject to any disclaimer, the term of this patent is extended or adjusted under 35 U.S.C. 154(b) by 681 days.

(21) Appl. No.: 15/307,543

(22) PCT Filed: Mar. 25, 2015

(86) PCT No.: PCT/EP2015/056357
§ 371 (c)(1),
(2) Date: Mar. 8, 2017

(87) PCT Pub. No.: WO2015/165652
PCT Pub. Date: Nov. 5, 2015

(65) Prior Publication Data
US 2017/0214303 A1    Jul. 27, 2017

(30) Foreign Application Priority Data

Apr. 29, 2014 (DE) .................. 10 2014 208 077

(51) Int. Cl.
*H02K 15/00* (2006.01)
*H02K 15/06* (2006.01)
(Continued)

(52) U.S. Cl.
CPC .......... *H02K 15/064* (2013.01); *H02K 3/12* (2013.01); *H02K 3/28* (2013.01); *H02K 15/0031* (2013.01);
(Continued)

(58) Field of Classification Search
CPC ......... Y10T 29/49009; Y10T 29/49071; Y10T 29/53143; Y10T 74/18024; Y10T 29/5317;
(Continued)

(56) References Cited

U.S. PATENT DOCUMENTS

| | | |
|---|---|---|
| 1,742,190 A | 1/1930 | Apple et al. |
| 2,400,902 A | 5/1946 | Allen et al. |

(Continued)

FOREIGN PATENT DOCUMENTS

| | | |
|---|---|---|
| CN | 1768465 A | 5/2006 |
| CN | 101350547 A | 1/2009 |

(Continued)

OTHER PUBLICATIONS

German Office Action dated Apr. 5, 2019 for corresponding German Patent Application No. 10 2014 208 077.0.

(Continued)

*Primary Examiner* — Thiem D Phan

(57) ABSTRACT

The disclosure relates to a method for producing a winding of a winding carrier of an electric machine. The method includes providing a laminated core. The laminated core has an axis and a first slot for accommodating a first winding segment for producing the winding. The first slot extends in the direction of the axis. The first slot is arranged on a first circle as viewed in the direction of the axis, through the circle center point of which first circle the axis extends. The method includes: arranging the first winding segment in the first slot, where a first region of the first slot protrudes from (Continued)

the laminated core; and bending the first region by applying a first force acting in the direction of the axis and by applying a first force acting tangentially to the first circle onto the first region in a first direction tangentially to the first circle.

8 Claims, 8 Drawing Sheets

(51) Int. Cl.
*H02K 15/085* (2006.01)
*H02K 3/12* (2006.01)
*H02K 3/28* (2006.01)

(52) U.S. Cl.
CPC ...... *H02K 15/085* (2013.01); *Y10T 29/49009* (2015.01); *Y10T 29/49012* (2015.01)

(58) Field of Classification Search
CPC .......... H02K 15/064; H02K 3/04; H02K 3/12; H02K 3/28; H02K 15/024
USPC .................. 29/596, 564.1, 598, 605, 732
See application file for complete search history.

(56) References Cited

U.S. PATENT DOCUMENTS

| | | |
|---|---|---|
| 4,437,230 A | 3/1984 | Greutmann |
| 6,339,871 B1 | 1/2002 | Maesoba et al. |
| 6,462,453 B1 | 10/2002 | Asao et al. |
| 6,694,598 B2 * | 2/2004 | Takahashi .......... H02K 15/0428 29/596 |
| 2002/0046779 A1 | 4/2002 | Even |
| 2003/0005579 A1 | 1/2003 | Takahashi et al. |
| 2009/0302705 A1 | 12/2009 | Guercioni |

FOREIGN PATENT DOCUMENTS

| | | |
|---|---|---|
| CN | 103314508 A | 9/2013 |
| CN | 103427571 A | 12/2013 |
| DE | 4031276 A1 | 4/1992 |
| DE | 60210572 T2 | 3/2007 |
| DE | 102013206532 A1 | 10/2013 |
| FR | 2808939 A1 | 11/2001 |
| JP | 2002335657 A | 11/2002 |
| JP | 2006136082 A | 5/2006 |
| WO | 2012093413 A1 | 7/2012 |
| WO | 2013127541 A2 | 9/2013 |

OTHER PUBLICATIONS

International Search Report and Written Opinion dated Nov. 3, 2015 from corresponding International Patent Application No. PCT/EP2015/056357.

German Office Action dated Dec. 11, 2014 for corresponding German Patent Application No. 10 2014 208 077.0.

Chinese Office Action dated May 16, 2018 for corresponding Chinese Patent Application No. 201580022716.4.

* cited by examiner

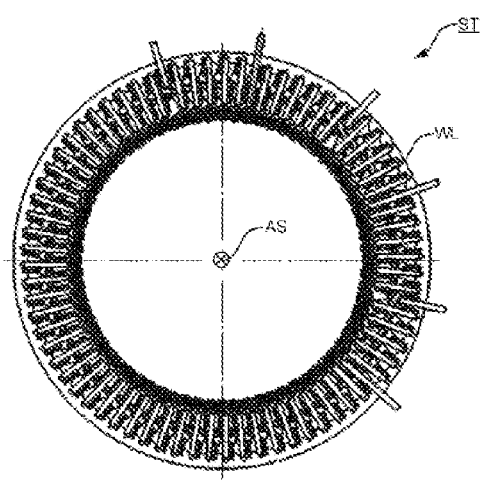
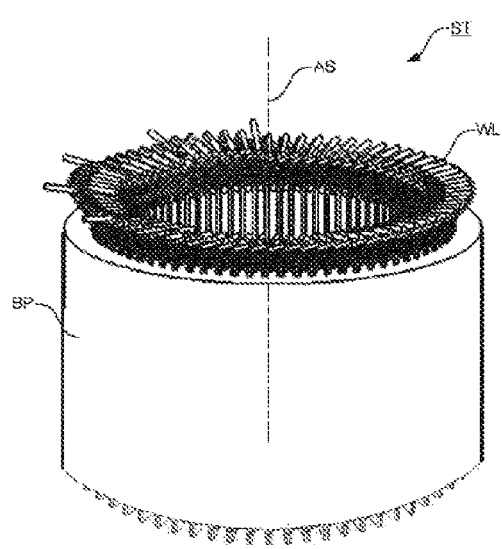
Figure 1A
Figure 1B

METHOD FOR PRODUCING A WINDING OF A WINDING CARRIER OF AN ELECTRIC MACHINE

TECHNICAL FIELD

The present disclosure relates to a method and to a device for producing a winding of a winding carrier, that is to say of a stator or of a rotor, or an electric machine. The disclosure furthermore relates to a winding carrier of an electric machine, and to an electric machine having at least a mentioned winding carrier.

BACKGROUND

Electric machines have winding carriers that have a laminated sheet package including windings that are introduced into the laminated sheet package, and which are configured as a stator or a rotor of the electric machines. The power that may be outputted from an electric machine of this type depends proportionally on the effective length of the laminated sheet package of the winding carrier. Herein, the effective length of a laminated sheet package of a winding carrier means the axial length of the region of the laminated sheet package assembled from sheet-metal disks from in which an excitation field is configured, or on which an excitation field has any influence.

In many application fields the requirement of dimensioning the electric machines so as to be as space-saving as possible is high such that the electric machines occupy as little installation space as possible, on the one hand, and have weights that are as low as possible, on the other hand. This is particularly relevant in automotive applications since the electric machines due to the limited installation spaces in vehicles and of the requirement of reducing weight in vehicles while maintaining or even increasing the power density must be built to be as small and as light as possible.

SUMMARY

Therefore, it is desirable to provide a possibility for producing electric machines having a higher power density while maintaining the same axial length.

According to a first aspect of the disclosure, a method for producing a winding of a winding carrier, which is to say of a stator or of a rotor, of an electric machine is provided.

In some implementations, a laminated sheet package has an axis and at least one first slot that extends in the direction of the axis, for receiving at least one first winding segment for producing the winding. Herein, the at least one first slot, when viewed in the direction of the axis, is disposed on a first circle, the axis running through the circle center of the latter. The at least one first winding segment is disposed in the at least one first slot. Herein, the at least one first winding segment is disposed in the at least one first slot in such a manner that at least one first region of the at least one first winding segment protrudes from the laminated sheet package. The first region by exerting on the first region a first force, acting in the direction of the axis, and a first force, acting tangentially to the first circle, is subsequently bent in a first direction, tangential to the first circle.

For the first region to be bent, forces which, when illustrated as force vectors in a three-dimensional coordinate system in which one of the coordinate axis runs parallel with the axis of the laminated sheet package, may only be substantially grouped or dissected, respectively, in one force component that points in the direction that is parallel with the axis of the laminated sheet package, and in one force component that points in a direction that is tangential to the first circle. In other words, the forces that are exerted on the first region interact substantially only in a direction that is parallel with the axis of the laminated sheet package, and in a direction tangential to the first circle.

By exerting these two aforementioned forces which preferably act simultaneously, that first region of the first winding segment that serves for forming a winding overhang of the windings may be bent across the entire length thereof. The first region after the bending procedure thus has no projecting end portion at all which, when viewed axially, leads to a comparatively long winding overhang. As a result, a winding carrier having a comparatively shorter winding overhang and thus a comparatively longer laminated sheet package may be produced, while maintaining an identical total construction length and thus having a higher power density.

Implementations of the disclosure may include one or more of the following optional features. The winding segment herein is a leg of a hairpin-shaped winding pin, for example, or a rod-shaped straight wire of metal or a metal alloy, for example, of copper or a copper alloy, which for forming the winding has been introduced into the slot.

If the winding segment is configured as a leg of a hairpin-shaped winding pin, the winding pin is initially crossed and, except for the exposed region, is introduced in a cranked manner into the respective slot. By contrast, if the winding segment is configured as a rod-shaped straight wire, the latter, except for two exposed end regions, is first introduced into the respective slot and subsequently crossed at the two end regions.

In some implementations, the first region is bent by means of a first contact face that is moved toward the laminated sheet package and is simultaneously rotated about the axis of the laminated sheet package. When moved and rotated, the first contact face physically contacts the first region, or an exposed end side of the first region, respectively, where the first contact face exerts on the first region, or on the exposed end side of the first region, respectively, the first force, acting in the direction of the axis, and the first force, acting tangentially to the first circle. In some implementations, the first force, acting in the direction of the axis, is a compressive force, and the first force, acting tangentially to the first circle, is a frictional force between the first contact face and the exposed end side of the first region.

In some examples, by bending the first region by way of only one contact surface which exerts on the first region only a compressive force and a frictional force, the first region, or the first winding segment, respectively, in the case of the abovementioned bending procedure is subjected to a comparatively substantially low mechanical stress than in the case of a bending procedure in the case of which the first region is retained and bent by a gripper element that in the case of the bending procedure retains the first region on at least two mutually opposite sides.

In some examples, it is further provided that a laminated sheet package having the aforementioned at least one first slot is provided having yet at least one second slot, extending in the direction of the axis, for receiving at least one second winding segment for producing the winding. The at least one second slot, when viewed in the direction of the axis, is disposed on a second circle, the axis of the laminated sheet package running through the circle center of the latter. The at least one second winding segment is disposed in the at least one second slot, where a second region of the at least one second winding segment protrudes from the laminated sheet package. The second region by exerting on the second region a second force, acting in the direction of the axis, and a second force, acting tangentially to the second circle, is bent in a second direction, tangential to the second circle and substantially facing the at least one first winding segment.

In some examples, by exerting these two last-mentioned forces, the second region of the second winding segment, which likewise serves for forming the winding overhang of the windings, may be bent across the entire length thereof, in a manner analogous to the first region of the first winding segment. Thus, the second region after the bending procedure has no projecting end portion at all which, when viewed axially, leads to a comparatively long winding overhang. As a result, a winding carrier furthermore having a comparatively shorter winding overhang and thus a comparatively longer laminated sheet package may be produced, while maintaining an identical total construction length and thus having a higher power density.

In some implementations, in a manner analogous to the first region, the second region is bent by means of a second contact face that, in a manner analogous to the first contact face, is moved toward the laminated sheet package and herein is rotated about the axis of the laminated sheet package. When moved and rotated, the second contact face physically contacts the second region, or an exposed end side of the second region, respectively, where the second contact face exerts on the second region, or on the exposed end side of the second region, respectively, the second force, acting in the direction of the axis, and the second force, acting tangentially to the second circle.

Bending of the second region by way of only the second contact surface has the same advantages as in the case of bending the first region by way of the first contact face.

In some examples, the first and the second regions are bent in a substantially simultaneous manner. This means that the two regions are not bent in a temporally successive manner but substantially in one and the same time interval. In some examples, the two regions are bent so as to be mutually temporally offset by a predefined temporal spacing. This means that the bending procedure of the first region, and the bending procedure of the second region do not take place one after another, but largely in one and the same time interval, wherein the one bending procedure, however, commences shortly after the other bending procedure has been started. In some examples, the region that is first bent is located farther away from the axis as viewed radially from the axis.

The implementations discussed have the advantage that the winding carrier in the case of the bending procedures is subjected to comparatively lower total external force effects, since the tangentially acting forces act on the winding carrier in mutually facing directions and, viewed in relation to the winding carrier as a whole, are thus mutually compensating.

In some implementations, a first exposed end portion of the already bent first region is in electrical terms connected to a second exposed end portion of the likewise already bent second region. To this end, an electrically conducting connection element such as in the form of an electrically conducting wire or an electrically conducting rail, for example, may be positioned between the first and the second exposed end portion and is subsequently connected in an electrically conducting and physical manner, for example in a soldering/brazing or welding procedure, to the first and the second end portion.

According to a further aspect of the disclosure, a device for producing a winding of a winding carrier, that is to say of a stator or of a rotor, of an electric machine is provided. The device includes a holding assembly that is designed to retain a laminated sheet package such that the latter in relation to the holding assembly may move neither axially, nor radially, nor tangentially. In some examples, the laminated sheet package has an axis and at least one first slot, extending in the direction of the axis, for receiving at least one first winding segment for producing the winding. Herein, the at least one first slot, when viewed in the direction of the axis, is disposed on a first circle, the axis of the laminated sheet package running through the circle center of the latter. The at least one first winding segment is disposed in the at least one first slot, where a first region of the at least one winding segment protrudes from the laminated sheet package.

In some examples, the device furthermore includes a first bending assembly, which in turn includes a first drive unit and a first contact face. Herein, the first drive unit is designed to move the first contact face in the direction toward the laminated sheet package and rotate the first contact face simultaneously about the axis of the laminated sheet package. The first contact face when moved and rotated by the first drive unit is designed to physically contact the first region, or an end side of the first region, respectively, and to bend the first region in a first direction, tangential to the first circle. In some examples, the first contact face exerts on the first region a first force, acting in the direction toward the axis of the laminated sheet package, and a first force, acting tangentially to the first circle, and in this way bends the first region in the first direction, tangential to the first circle.

, the device comprises a holding assembly for retaining a laminated sheet package about an axis of the laminated sheet package such that the laminated sheet package cannot be rotated. The first bending assembly comprise a first drive unit for moving a first contact face in the direction toward the laminated sheet package and for rotating the first contact face about the axis in a first rotation direction in relation to the laminated sheet package. The first bending assembly may furthermore include the first contact face for bending a first region of at least one first winding segment disposed in the laminated sheet package, by exerting a compressive force, acting in a direction of the axis on the first region, and a frictional force, acting tangentially to the first rotation direction on the first region.

In some implementations, the holding assembly is furthermore designed to retain a laminated sheet package which, beside the at least one first slot, has at least one second slot, extending in the direction of the axis, for receiving at least one second winding segment for producing the winding, wherein the at least one second slot, when viewed in the direction of the axis, is disposed on a second circle, the axis of the laminated sheet package running through the circle center of the latter.

In some examples, the device furthermore includes a second bending assembly, which has a second drive unit and a second contact face. The second drive unit is designed to move the second contact face in a direction toward the laminated sheet package and simultaneously rotate the second contact face about the axis of the laminate sheet package. The second contact face when moved and rotated by the second drive unit is designed to physically contact the second region, or an end side of the second region, respectively, and to bend the second region in a second direction, tangential to the second circle and substantially facing the at least one first winding segment. Herein, the second contact face may exerts on the second region a second force, acting in the direction toward the axis of the laminated sheet package, and a second force, acting tangentially to the second circle, and in this way bends the second region in the second direction, tangential to the second circle.

In some implementations, the device includes a second bending assembly for bending a second region of at least one second winding segment disposed in the laminated sheet package. The second bending assembly may include a second drive unit for moving a second contact face in the direction toward the second region, and for rotating the second contact face about the axis in a second rotation direction that is counter to the first rotation direction. Moreover, the second bending assembly may include the second contact face for exerting a compressive force, acting in the direction of the axis on the second region, and a frictional force, acting tangentially to the second rotation direction on the second region.

In some implementations, the first contact face has a first rough surface for pushing the first region in the direction tangential to the first circle. In an analogous manner, the second contact face preferably has a second rough surface for pushing the second region in the direction tangential to the second circle and substantially facing the at least one first winding segment. The first and the second surface preferably have a roughness of k≥0.0015 mm, ≥0.01 mm, or ≥0.05 mm, for examples ≥0.1 mm, or ≥0.2 mm.

In some implementations, the first contact face has a number of first shaped elements such as, for example, grooves, ribs, or teeth, which when viewed in the direction of the axis extend radially away from the axis. These first shaped elements in the case of the bending procedure of the first region may serve for pushing the first region in the direction tangential to the first circle. In an analogous manner, the second contact face has a number of second shaped elements such as, for example, grooves, ribs, or teeth, which when viewed in the direction of the axis extend radially away from the axis. In an analogous manner to the first shaped elements, the second shaped elements serve for pushing the second region in the direction tangential to the second circle and substantially facing the at least one first winding element.

The aforementioned rough surfaces or shaped elements ensure that the regions of the respective winding segments in the respective bending procedure are actually bent in the desired bending direction.

Another aspect of the disclosure provides a winding carrier, that is to say a rotor or a stator, of an electric machine, which includes a laminated sheet package, which in turn has an axis, at least one first slot, and at least one second slot. Herein, the at least one first slot and the at least one second slot, when viewed from the axis, are disposed in such a way to be mutually radially offset and thus so as to be spaced from the axis at dissimilar radial spacings. In this way, the at least one first slot is disposed on a first circle to be concentric with the axis, and the at least one second slot is disposed on a second circle so as to be concentric with the axis. The winding carrier may furthermore include at least one first winding segment that is disposed in the at least one first slot and has a first region that protrudes from the laminated sheet package and is bent in a first direction, tangential to the first circle. Furthermore, the winding carrier may include at least one second winding segment that is disposed in the at least one second slot and has a second region protruding from the laminated sheet package and is bent in a second direction, tangential to the second circle and substantially facing the at least one first winding segment.

Implementations of the disclosure may include one or more of the following optional features. In some implementations, the winding carrier includes an electrically conducting connection element, for example in the form of an electrically conducting wire or of an electrically conducting rail, which in electrically conducting and physical terms is connected to a first exposed end portion of the first region and to a second exposed end portion of the second region. In this way, the electrically conducting connection element by way of the first and of the second winding segment forms the winding of the winding carrier of the electric machine.

In some examples, an electric machine having at least one of the afore-described winding carriers is provided, where the winding carrier is configured as a stator or a rotor of the electric machine.

Advantageous design examples of the method illustrated above, to the extent that the former are otherwise applicable to the abovementioned device, to the aforementioned winding carrier, or to the aforementioned electric machine, respectively, are also to be considered as being advantageous design examples of the device, of the winding carrier, or of the electric machine respectively.

The details of one or more implementations of the disclosure are set forth in the accompanying drawings and the description below. Other aspects, features, and advantages will be apparent from the description and drawings, and from the claims.

DESCRIPTION OF DRAWINGS

FIGS. 1A, 1B, and 1C show a stator in a plan view (FIG. 1A) and in an oblique lateral view (FIG. 1B), and a portion of the stator in a plan view (FIG. 1C), in respective schematic illustrations.

Like reference symbols in the various drawings indicate like elements.

DETAILED DESCRIPTION

Figure 1C:
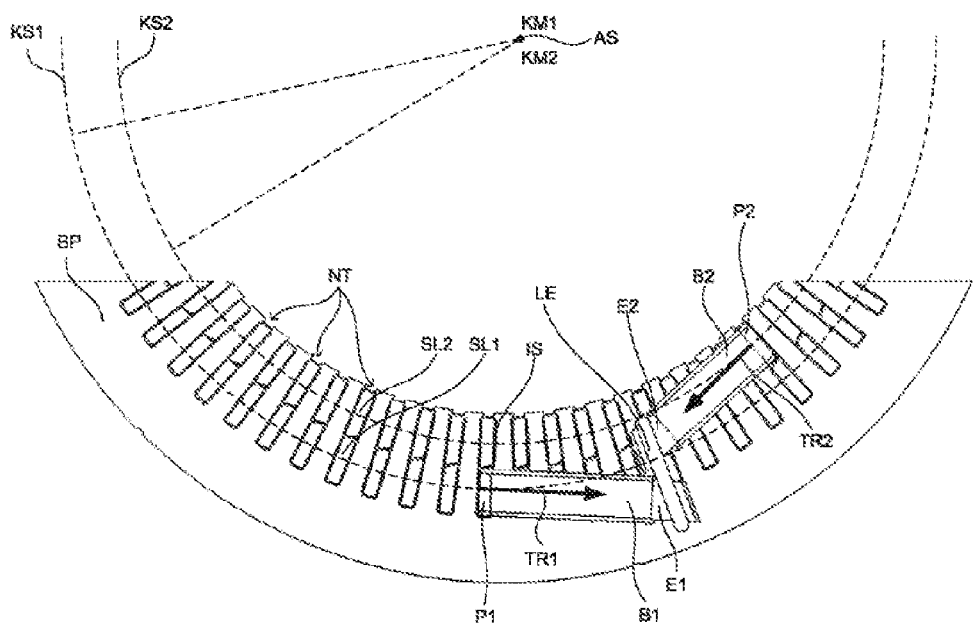

Referring to FIGS. 1A, 1B, and 1C in which a stator ST of an electric machine is schematically illustrated in a plan view and in an oblique lateral view, respectively, and the portion of the stator ST is schematically illustrated in a plan view.

The stator ST includes a laminated sheet package BP. The laminated sheet package BP may be configured in a hollow-cylindrical manner, encircling an axis AS, and has a group of grooves NT. The grooves NT, when viewed from the axis AS, are disposed as radial depressions uniformly distributed on an internal wall of the laminated sheet package BP that faces the axis AS, and extend from a first end of the laminated sheet package BP in the direction of the axis AS to another end of the laminated sheet package BP that is opposite the first end.

In some examples, each groove NT has in each case one first and one second region, each formed to extend from the first end to the second end of the laminated sheet package BP. When viewed from the axis BP, the first and the second region of the respective grooves NT lie in a radially sequential manner Due to the narrow and elongate shape, the first regions of the respective grooves NT are referred to hereunder as the first slots SL1, and the second regions of the respective grooves NT are referred to as the second slots SL2.

In some examples, the first slots SL1, or the centers of gravity thereof, respectively, when viewed in the direction of the axis AS, are disposed on a first "virtual" circle KS1 having a first circle center KM1. Similarly, the second slots SL2, or the centers of gravity thereof, respectively, when viewed in the direction of the axis AS, are disposed on a second "virtual" circle KS2 having a second circle center KM2. The first and the second circle KS1 and KS2 herein form two mutually concentric circles that are also concentric with the axis AS. When viewed in the direction of the axis AS, the circle centers KM1, KM2 are mutually overlapping, and overlap with the axis AS.

Winding pins WP, also referred to as winding rods, from a copper alloy, which are pre-bent in a hairpin-shape or a U-shape and each have two legs, are disposed in the respective slots SL1 and SL2. To form windings, the winding pins WP, in a manner known to a person skilled in the art, by way of a spreading step across a pole pitch of the laminated sheet package BP are crossed and cranked such that the two mutually cranked legs of each individual winding pin WP, in a manner corresponding to the pole pitch of the laminated sheet package BP, may be plugged into the respective slots SL1, SL2. Since the two legs of each individual winding pin WP form one portion of the winding WL, the former will hereunder be referred to as winding segments.

The manner in which the winding WL of the stator ST is produced will be described hereunder in an exemplary manner by means of the first and of the second winding segments P1, P2, respectively, as illustrated in FIG. 1C.

In some examples, one first winding segment P1 of the respective winding pins WP is disposed in a plug-fitted manner in each of the respective first slots SL1 of the respective grooves NT, where only one winding segment is illustrated in an exemplary manner in FIG. 1C. Similarly, one second winding segment P2 of the respective winding pins WP is disposed in the respective second slots SL2 of the respective grooves NT, in a manner known to a person skilled in the art, the winding pins WP being offset according to the pole pitch, where only one winding segment is illustrated in an exemplary manner in FIG. 1C. For the winding WL to be produced, the first winding segment P1 and the second winding segment P2 have to be electrically connected. To this end, these two winding segments P1, P2 are mutually bent and electrically interconnected in manner to be described hereunder.

In some examples, the first and the second winding segments P1 and P2, like the remaining winding segments not illustrated in the figure, in a manner known to a person skilled in the art, are mutually electrically insulated and insulated in relation to the laminated sheet package BP by means of insulating paper IS.

The first winding segment P1 may have a first region B1 that protrudes from the laminated sheet package BP, as is visualized in FIG. 1C. Analogously, the second winding segment P2 has a second region B2 that likewise protrudes from the laminated sheet package BP.

The first region B1 of the first winding segment P1 is bent in a direction TR1, tangential to the first circle KS1. Similarly, the second region B2 of the second winding segment P2 is bent in a direction TR2, tangential to the second circle KS2 and substantially in the direction toward the first region B1.

The first region B1 of the first winding segment P1 has a first exposed end portion E1. Similarly, the second region B2 of the second winding segment P2 has a second exposed end portion E2. The first end portion E1 of the first winding segment P1 is electrically connected to the second end portion E2 of the second winding segment P2. For the electrical connection between the first and the second end portions E1 and E2 to be formed, an electrically conducting connection element LE in the form of a pin is provided, which is electrically conductive and physically connected to the first and to the second exposed end portions E1 and E2. As a result, the first and the second regions B1 and B2 and the connection element LE form the winding overhang of the stator ST together with the further regions of the remaining winding segments.

In some examples, electrical connections in pairs of this type between the first and the second winding pin WP on the respective first and the respective second end portion E1, E2, and with the aid of the connection element LE, continue across the entire circumference of the laminated sheet package BP, with the exception of a few end portions for forming current connectors for the winding WL, until complete windings WL that pass through the entire laminated sheet package BP are configured.

In some examples, since the first and the second regions B1, B2, of the winding segments P1, P2, that are not surrounded by the laminated sheet package BP, including the respective end portions E1, E2, are bent without projection protrusions and completely in the direction TR1 and TR2, both tangential to the first and the second circle KS1 and KS2, respectively, the respective end portions E1, E2, at identical bending angles of the regions B1, B2, have a comparatively minor installation height. As a result, the stator ST in the case of a same axial length, compared to conventional stators may be produced having a longer laminated sheet package and thus having a higher available output. A comparison between the above-described stator ST and a conventionally produced stator is yet to be described in detail with respect to FIG. 5.

Figure 2A:
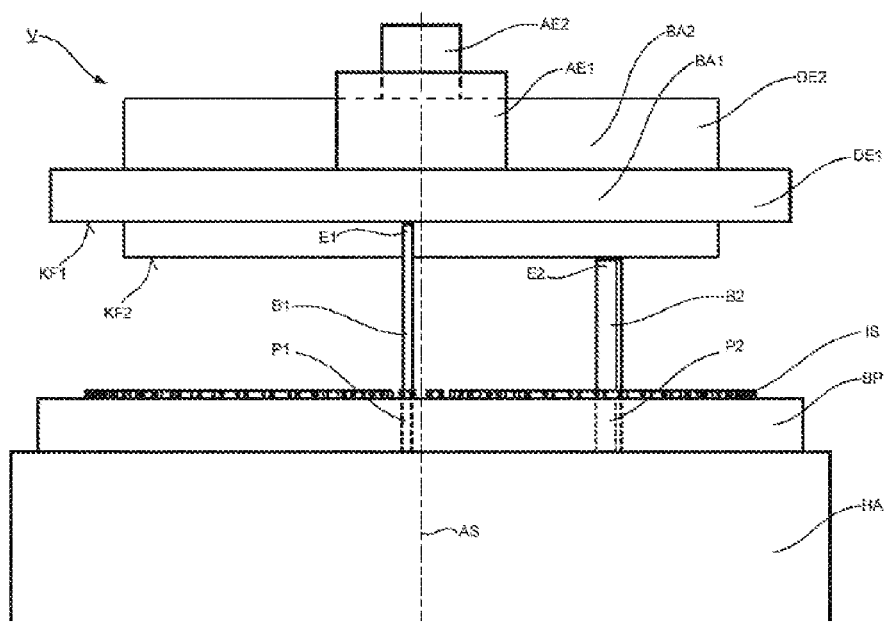
FIGS. 2A and 2B show a device for producing a stator as illustrated in FIGS. 1A to 1C, in a lateral view (FIG. 2A), and contact faces of the device in a plan view (FIG. 2B), in respective schematic illustrations.
Figure 2B:
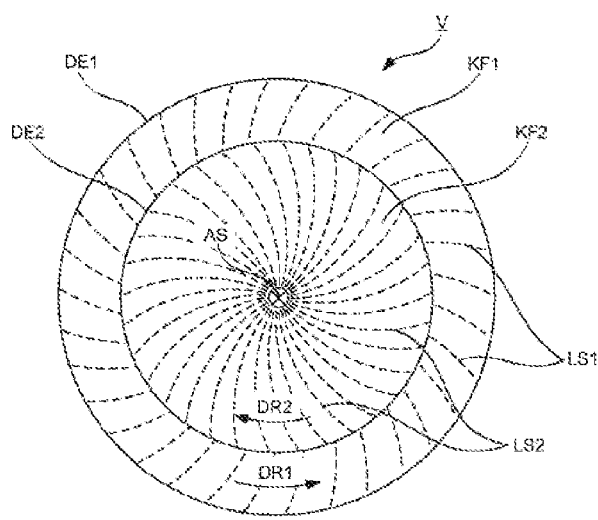

Having described in detail the stator ST of an electric machine in FIG. 1, a device V for producing the winding WL of the stator ST will be described in more detail hereunder with respect to FIGS. 2A and 2B. Herein, the figures show the device V in a schematic lateral view (FIG. 2A) and in a schematic view from below (FIG. 2B).

The device V includes a holding assembly HA, a first bending assembly BA1, and a second bending assembly BA2.

In some examples, the holding assembly HA is configured so to be hollow-cylindrical, and has a number of retaining elements (not illustrated in the figures) by means of which the holding assembly HA retains the laminated sheet package BA so as to be concentric about an axis of the holding assembly HA, where the axis of the holding assembly HA simultaneously is also the axis AS of the laminated sheet package BP.

In some implementations, the first bending assembly BA1 in turn includes a first drive unit AE1 and a first pressure unit DE1 having a first contact face KF1.

The first drive unit AE1 may include a suitable drive (not illustrated in the figures) by way of which the first drive unit AE1 moves the first pressure unit DE1 including the first contact face KF1 in the direction toward the holding assembly HA, simultaneously rotating the first pressure unit DE1 including the first contact face KF1 about the axis AS in relation to the holding assembly HA.

The first pressure unit DE1, when moved and rotated by the first drive unit AE1, is designed to bend the first region B1 of the first winding segment P1 by way of the first contact face KF1 in a manner to be described hereunder.

The first contact face KF1 may be configured as a doughnut-shaped face that is concentric with the holding assembly HA, and is located on a side of the first pressure unit DE1 that faces the holding assembly HA. The first contact face KF1 has rough linear structures LS1 that are shaped so as to be curved counter to the rotation direction DR1 of the first pressure unit DE1 and radially extend away from the axis AS. In some implementations, the first contact face KF1 may have a non-structured rough surface.

Analogously, the second bending assembly BA2 may include a second drive unit AE2 and a second pressure unit DE2 having a second contact face KF2.

In some examples, the second drive unit AE2, like the first drive unit AE1, includes a suitable drive (not illustrated in the figures) by way of which the second drive unit AE2 moves the second pressure unit DE2 including the second contact face KF2 in the direction toward the holding assembly HA, simultaneously rotating the second pressure unit DE2 including the second contact face KF2 about the axis AS and in relation to the holding assembly HA. The second drive unit AE2 may be designed in such a manner that the former rotates the second pressure unit DE2 in a rotation direction DR2 that at all times is counter to the rotation direction DR1 of the first pressure unit DE1 by the first drive unit AE1.

In some examples, the second pressure unit DE2, when moved and rotated by the second drive unit AE2, is designed to bend the second region B2 of the second winding segment P2 by way of the second contact face KF2 in a manner to be described hereunder.

In some examples, the second contact face KF2 is configured as a doughnut-shaped face that is concentric with the holding assembly HA, and is located on a side of the second pressure unit DE2 that faces the holding assembly HA. Similar to the first contact face KF1, the second contact face KF2 likewise has rough linear structures LS2 which are shaped so as to be curved counter to the rotation direction DR2 of the second pressure unit DE2 and radially extend away from the axis AS. In some examples, the second contact face KF2 may have a non-structured rough surface.

Figure 3:
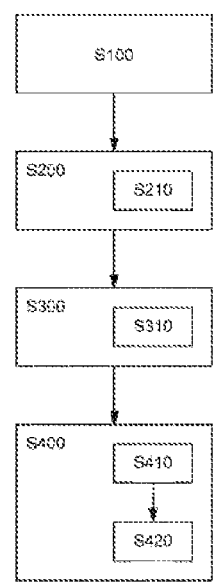
FIG. 3 shows a method for producing the stator as illustrated in FIGS. 1A to 1C in a schematic flow diagram.
Figure 4A:
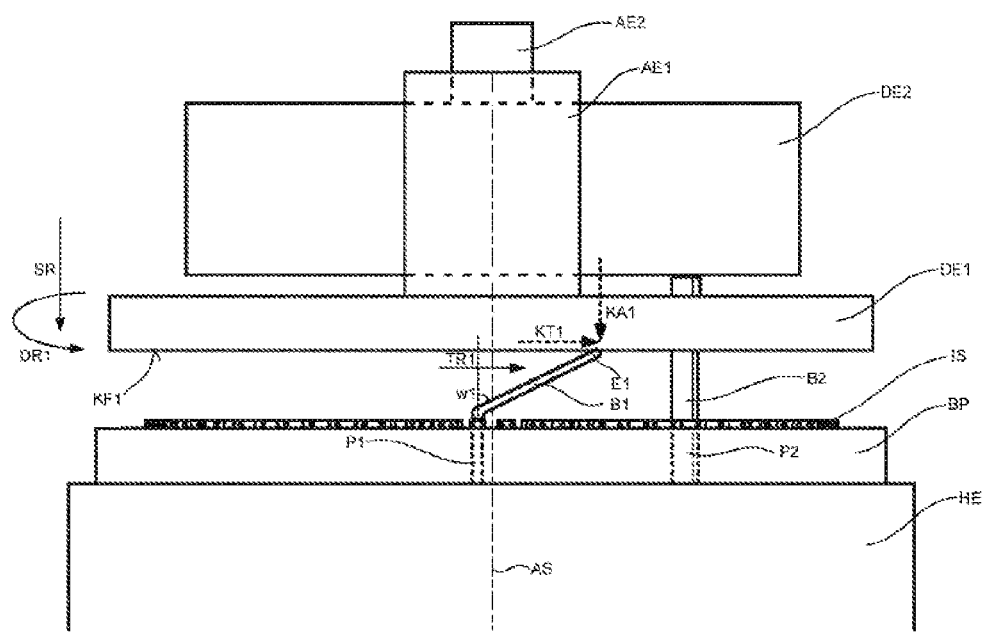
FIGS. 4A to 4C show the stator as an intermediate product, after each method step of the method as illustrated in FIG. 3, including the device as illustrated in FIGS. 2A and 2B, in respective schematic illustrations.
Figure 4B:
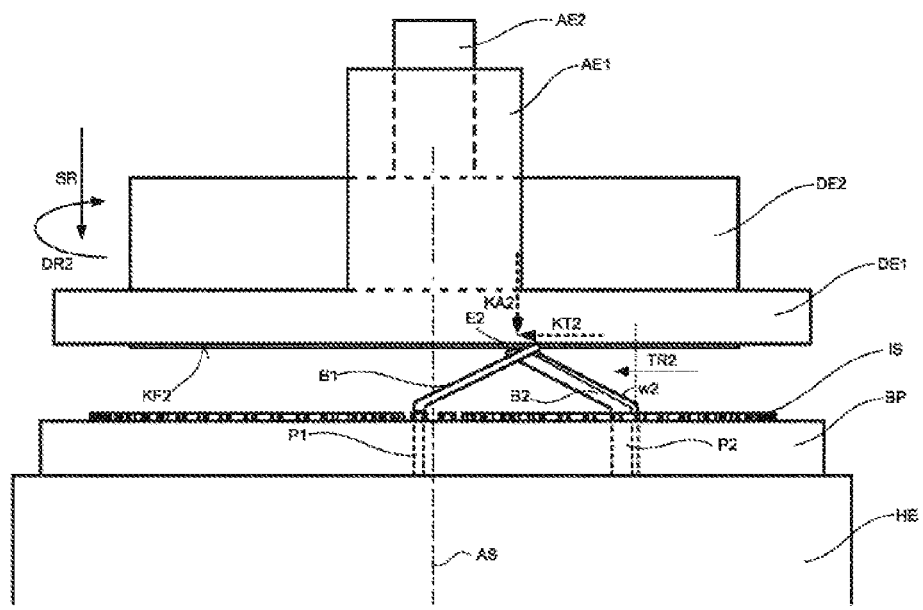
Figure 4C:
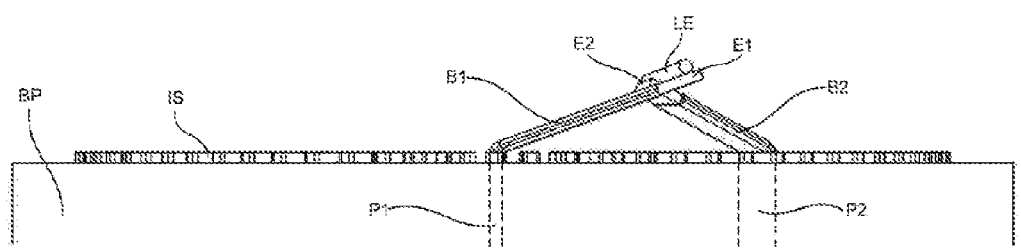

Having described the device V for producing the winding WL of the stator ST in detail, a method for producing the winding WL will be described in more detail hereunder with respect to FIGS. 3 and 4A to 4C. Herein, FIG. 3 shows the flow of the method in a schematic flow diagram, and FIGS. 4A to 4C show the device V including the stator ST prior to, during, or after respective method steps.

For a winding WL of a stator ST to be produced according to a first method step S100, a laminated sheet package BP is provided. In some examples, the laminated sheet package BP is assembled from a number of sheet-metal disks which have been punched from a sheet-metal strip in a manner known to a person skilled in the art. In some implementations, the sheet-metal disks are punched such that the assembled laminated sheet package BP has a number of grooves NT, extending in the direction of the axis AS of the laminated sheet packages BP, that corresponds to the pole pitch of the stator ST. In turn, the grooves NT herein may each be subdivided into a first slot SL1 and a second slot SL2. These first and second slots SL1, SL2 each extend from the first end to the second end of the laminated sheet package BP and, when viewed from the axis AS, lie in a radially sequenced manner.

According to further method steps S200 and S210, the first and the second winding segments P1 and P2 of the respective winding pins WP are plug-fitted in to these two slots SL1 and SL2. Herein, the winding pins WP, in a manner known to a person skilled in the art, by way of a spreading step across a pole pitch of the laminated sheet package BP are crossed and cranked in a manner corresponding to the pole pitch of the stator ST, and plug-fitted so as to be mutually offset in a manner corresponding to the pole pitch.

In some implementations, the first and the second winding segments P1, P2 are mutually electrically insulated and insulated in relation to the laminated sheet package BP by means of insulating paper IS which is disposed between the respective first and the second winding segments P1, P2 and interior walls of the slots SL1, SL2.

For the method to be illustrated in a readily understandable manner, the method hereunder is described in more detail by means of only one first winding segment P1 of a winding pin WP, and of one second winding segment P2 of a further winding pin WP that lies offset so as to correspond to the pole pitch of the stator ST, where this first and this second winding segments P1, P2 have to be electrically interconnected in order for the winding WL to be formed.

In some examples, the first and the second winding segments P1 and P2 are plug-fitted into the respective first and second slots SL1, SL2 in such a manner that a first region B1 of the first winding segment P1, and a second region B2 of the second winding segment P2 each protrude from the laminated sheet package BP.

In order for the winding WL to be formed, the first and the second regions B1, B2 are first mutually bent according to the subsequent method steps S300 and S310. As a result, the laminated sheet package BP including the winding pins WP is disposed in the device V, so as to be immovably held by the holding assembly HA.

The first drive unit AE1 and the first pressure unit DE1 of the first bending assembly BA1 may be subsequently placed above the laminated sheet package BP and aligned to the laminated sheet package BP such that the first pressure unit DE1 lies so as to be concentric with the laminated sheet package BP, or with the axis AS, respectively.

The first drive unit AE1, according to the method step S300, then pushes the first pressure unit DE1 in the direction SR toward the laminated sheet package BP and thus toward the first winding segment P1, thereby rotating the first pressure unit DE1 in a first rotation direction DR1.

In some examples, the first contact face KF1 contacts an exposed end portion E1 of the first region B1 of the first winding segment P1, or the exposed end side thereof, respectively. In some examples, a first frictional force KT1 is created by the friction between the rough surface of the first contact face KF1 and the end side of the exposed end portion E1. This first frictional force KT1 acts on the exposed end portion E1 in a direction TR1, tangential to the first circle KS1. By rotating the first contact face KF1, the first frictional force KT1 thus pulls the exposed end portion E1 in the direction TR1, tangential to the first circle KS1.

By way of pushing by the first pressure unit DE1 in the direction toward the laminated sheet package BP, the former exerts on the end portion E1 of the exposed first region B1 a first compressive force KA1, acting in the direction of the axis AS, and thus pushes the end portion E1 in the direction of the axis AS. The exposed first region B1 is bent in the direction TR1, tangential to the first circle KS1, by way of this first compressive force KA1 and of the first friction force KT1, the latter forces acting simultaneously on the end portion E1. Herein, the first region B1 is bent to a first predefined and desired bending angle w1, as is illustrated in FIG. 4A.

In an analogous manner, the second drive unit AE2 and the second pressure unit DE2 of the second bending assembly BA2 are placed on the laminated sheet package BP and aligned to the laminated sheet package BP such that the second pressure unit DE2 lies so as to be concentric with the laminated sheet package BP, or with the axis AS, respectively.

The second drive unit AE2, according to the method step S310, then pushes the second pressure unit DE2 in the direction SR toward the laminated sheet package BP and thus toward the second winding segment P2, thereby rotating the second pressure unit DE2 in a second rotation direction DR2 that is counter to the first rotation direction DR1.

Herein, the second contact face KF2 contacts an exposed end portion E2 of the second region B1 of the second winding segment P2, or the exposed end side thereof, respectively. A second frictional force KT2 is created by the friction between the rough surface of the second contact face KF2 and the end side of the exposed end portion E2. This second frictional force KT2 acts on the exposed end portion E2 in a direction TR2, tangential to the second circle KS2. By rotating the second contact face KF2, this second frictional force KT2 thus pulls the exposed end portion E2 of the second region B1 in the direction TR2, tangential to the second circle KS2.

By way of pushing the second pressure unit DE2 in the direction toward the laminated sheet package BP, the former exerts on the end portion E2 of the exposed second region B2 a second compressive force KA2, acting in the direction of the axis AS, and thus pushes the end portion E2 in the direction of the axis AS. The exposed second region B2 is bent in the direction TR2, tangential to the second circle KS2, by way of this second compressive force KA2 and of the second frictional force KT2, the latter forces acting simultaneously on the end portion E2. Herein, the second region B2, similar to the first region B1, is bent to a second predefined and desired bending angle w2, as is visualized in FIG. 4B.

In some examples, the remaining first regions of the first winding segments, that are not illustrated in the figures and that are disposed to be uniformly distributed on the first circle KS1, so as to be concentric with the axis AS, and across the entire circumference of the laminated sheet package BP, similar to that first region B1 of the first winding segment P1 that has been described, are all bent together with the first region B1 to the first bending angle w1. Similarly, the remaining second regions of the second winding segments, that are likewise not illustrated in the figures and that are disposed to be uniformly distributed on the second circle KS2, so as to be concentric with the axis AS, and across the entire circumference of the laminated sheet package BP, similar to that second region B2 of the second winding segment P1 that has been described before, are all bent together with the second region B2 to the first bending angle w1.

The bending procedures according to the method steps S300 and S310 herein take place in parallel in a substantially simultaneous manner Preferably, according to the method step S300, the bending procedure of the first regions B1 of the first winding segments P1 starts so as to be temporally shortly before the bending procedure of the second regions B2 of the second winding segments P1, according to the method step S310, such that the partially bent and exposed end portions E2 of the second winding segments P2 do not obstruct the exposed end portions E1 of the first winding segments P1, impeding the further bending procedure of the first regions B1 of the first winding segments P1.

In some implementations, the two bending angles w1 and w2 are chosen such that the exposed end portions E1, E2 of two winding pins WP that are disposed so as to be mutually spaced apart so as to correspond to the pole pitch after respective bending procedures, when viewed from the axis AS in a radial direction, lie sequentially such that these two end portions E1 and E2 in a subsequent method step S400 may be electrically interconnected to form the winding WL.

The end portions E1, E2 of the bent exposed regions B1, B2 of the winding segments P1, P2 are electrically interconnected according to the method step S400, so as to correspond to the pole pitch of the stator ST. To this end, according to a method sub-step S410, an electrically conducting connection element LE in the form of a rod is positioned between the end portions E1, E2 of the first and of the second exposed region B1, B2 or the first or of the second winding segment P1, P2, respectively. Subsequently, in a subsequent soldering/brazing step S420, the connection element LE is soldered/brazed to the two end portions E1, E2 such that the two end portions E1, E2 including the connection element LE configure part of the winding WL, as is illustrated in FIG. 4C.

Herein, end portions of some of the selected winding pins WP that are electrically contacted by an external power supply are not electrically connected to other end portions.

Having described in more detail the method for producing the stator ST, it will be described hereunder with the aid of FIG. 5 what advantages the stator produced by the method described above offers in comparison to a stator produced by a conventional method.

Figure 5:
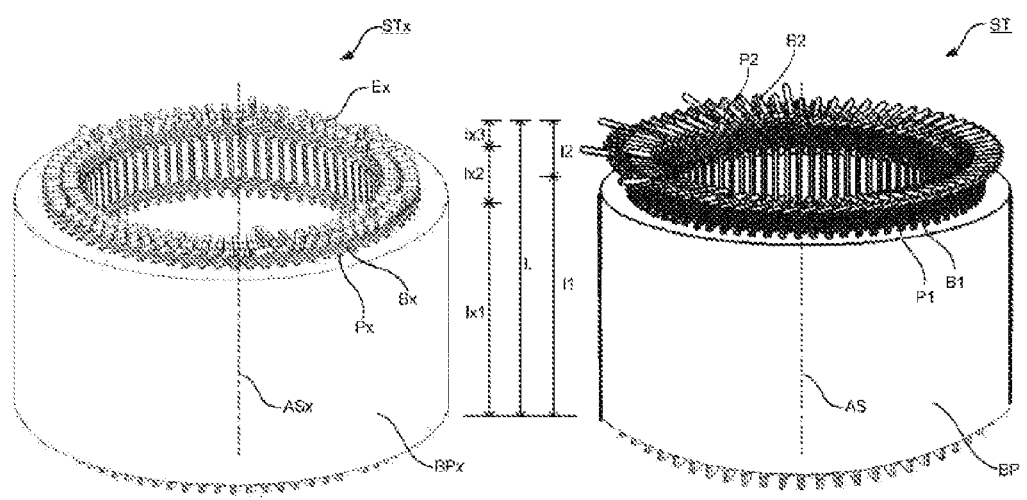
FIG. 5 shows a stator produced by a conventional method in comparison to the stator as illustrated in FIGS. 1A to 1C, in a schematic illustration.

A stator STx which has been produced by a conventional method is depicted on the left-hand side of FIG. 5. The stator STx has winding segments Px having bent exposed regions Bx, wherein the exposed regions Bx have end portions Ex which, when bending the exposed regions Bx, have been retained by holding elements (not illustrated in the figure) and been pulled by the holding elements in the circumferential direction of the laminated sheet package BPx of the stator STx. The end portions Ex of the exposed regions Bx, that in the case of the bending procedure have been retained by the holding elements, have not been conjointly bent and thus after the bending procedure protrude as projecting protrusions in the direction of the axis ASx of the stator STx, thus forming a portion having a height of 1×3 and extending in the direction of the axis ASx of the stator ST. The bent portions of the exposed regions Bx of the winding segments Px have a height of 1×2.

In the case of an application of the stator STx in an electric machine for driving a vehicle, a limited axial installation height L is available to the stator STx due to the restricted installation space in the vehicle. As has been described above, in the case of the conventionally produced stator STx, the projecting end portions Ex of the exposed regions Bx of the winding segments Px occupy an installation height of 1×3, and the bent portions of the regions Bx occupy an installation height of 1×2. In this way, the laminated sheet package BPx of the stator STx is left with a residual installation height of the entire installation height L of the stator STx of only 1×1. This residual installation height of 1×1 determines the output that can be effectively generated in operation by the electric machine having the stator STx.

The stator ST that has been produced by the method described above by means of FIG. 3 is depicted on the right-hand side of FIG. 5. Since this stator ST does not contain any projecting end portions as is the case with the previously described and conventionally produced stator STx, the laminated sheet package BP of the stator ST is left with a residual installation height of 11 of the entire installation height L of the stator ST minus the installation height 12 of the bent regions B1, B2 of the winding segments P1, P2. This residual installation height 11 of the laminated sheet package BP of the stator ST is larger than the residual installation height 1×1 of the laminated sheet package BPx of the stator STx. In this way, an electric machine having the stator ST produced as per the method according to the disclosure can generate a higher effective output than an electric machine having a stator STx produced as per the conventional method.

On account thereof, that the exposed regions B1, B2 of the winding segments P1, P2 as per the method described above by means of FIG. 3 each are bent only by exerting tangentially acting frictional forces KT1, KT2, and axially acting compressive forces KA1, KA2, in the case of the bending procedure forces that are comparatively lower act on the winding segments P1, P2 than in the case of a bending procedure as per the conventional method. This reduces the risk of the winding pins WP snapping during the bending procedure.

Rod-shaped straight wires from copper alloy may be used as winding segments instead of the hairpin-shaped winding pins. In this case, the winding segments, with the exception of in each case two exposed end regions, are first introduced at the respective opposite ends into the corresponding slots of the laminated sheet package, and are subsequently crossed at the respective two end regions.

In some examples, a first of the two end regions of the respective winding segments that are in a first and the same concentric row, the first end region being on the same side of the laminated sheet package, is bent so as to have a bending angle and is electrically connected to an end region of a winding segment which is disposed in a second concentric row, spaced apart so as to correspond to the winding step, and which has likewise been bent to have a bending angle.

In some examples, second end regions of the respective winding segments, that lie on the opposite side of the laminated sheet package, in the manner described in the context of FIG. 2, are bent so as to have dissimilar bending angles and in a corresponding manner are electrically connected to corresponding winding segments or to the external power supply.

The device V that has been described in the context of FIG. 1, and the method which has been described in the context of FIG. 2 relate to a winding having a two-tiered arrangement of winding segments, in which the winding segments are disposed so as to be distributed in two mutually concentric circles or rows, respectively. This device V, or this method, respectively, may also be used for producing a winding having a three-tiered or multiple-tiered, in particular a four-tiered arrangement of winding segments. As such, a simple respective modification of the device or of the method, which a person skilled in the art is readily capable of carrying out, is required, for example by way of additional bending installations having contact faces that are embodied in an analogous manner, and which only need to be configured or disposed, respectively, in a manner concentric with the present bending installations.

A number of implementations have been described. Nevertheless, it will be understood that various modifications may be made without departing from the spirit and scope of the disclosure. Accordingly, other implementations are within the scope of the following claims.

The invention claimed is:

1. A method for producing a winding of a winding carrier of an electric machine, the method comprising:
   providing a laminated sheet package, the laminated sheet package includes:
      an axis,
      at least one first slot, extending in a direction of the axis, for receiving at least one first winding segment for producing the winding, wherein the at least one first slot, when viewed in the direction of the axis, is disposed on a first circle, the axis running through a circle center of the first circle;
   disposing the at least one first winding segment in the at least one first slot, wherein a first region of the at least one first winding segment protrudes from the laminated sheet package; and
   bending the first region by exerting a first force, acting in the direction of the axis, and a frictional force, acting tangentially to the first circle, on the first region in a first direction tangential to the first circle;
   wherein bending of the first region is performed by way of a first pressure unit having a first contact face that is configured as a doughnut-shaped face having a linear structure or a non-structured rough surface extending away from the axis, the first contact face contacting an exposed end portion of the first region creating the frictional force that pulls the exposed end portion in the first direction tangential to the first circle.

2. The method of claim 1, wherein bending the first region includes moving a first contact face toward the laminated sheet package and rotating the first contact face about the axis, wherein the first contact face when moved and rotated physically contacts the first region, and exerts on the first region the first force, acting in the direction of the axis, and the first force, acting tangentially to the first circle.

3. The method of claim 1, wherein providing the laminated sheet package furthermore provides that the laminated sheet package is provided having at least one second slot, extending in the direction of the axis, for receiving at least one second winding segment for producing the winding, wherein the at least one second slot, when viewed in the direction of the axis, is disposed on a second circle, the axis running through the circle center of the second circle;
   wherein the method further comprises:
   disposing the at least one second winding segment in the at least one second slot, wherein a second region of the at least one second winding segment protrudes from the laminated sheet package; and
   bending the second region by exerting a second force, acting in the direction of the axis, and a second force, acting tangentially to the second circle, on the second region, in a second direction, tangential to the second circle and substantially facing the at least one first winding segment.

4. The method of claim 3, wherein bending includes moving a second contact face toward the laminated sheet package and rotating the second contact face about the axis, wherein the second contact face when moved and rotated physically contacts the second region, and exerts on the second region the second force, acting in the direction of the axis, and the second force, acting tangentially to the first circle.

5. The method of claim 3, wherein bending of the first region, and bending of the second region take place so as to be substantially simultaneous.

6. The method of claim 3, wherein bending of the first region, and bending of the second region take place so as to be mutually temporally offset by a predefined temporal spacing.

7. The method of claim 3, wherein the method furthermore comprises:
  connecting in electrical terms a first exposed end portion of the first region to a second exposed end portion of the second region.

8. The method of claim 7, wherein the method furthermore comprises:
  positioning of an electrically conducting connection element between the first exposed end portion and the second exposed end portion; and
  connecting in electrically conducting and physical terms the electrically conducting connection element to the first exposed end portion and to the second exposed end portion.

* * * * *